United States Patent [19]

Clementson et al.

[11] 4,096,083

[45] Jun. 20, 1978

[54] CLEANING METHODS AND COMPOSITIONS

[75] Inventors: John Joseph Clementson; Leo Pearson, both of Runcorn, England

[73] Assignee: Imperial Chemical Industries Limited, London, England

[21] Appl. No.: 689,542

[22] Filed: May 24, 1976

[30] Foreign Application Priority Data

May 29, 1975 United Kingdom ............... 23436/75

[51] Int. Cl.$^2$ .......................... C23G 5/02; C09D 9/00

[52] U.S. Cl. ............................. 252/171; 252/DIG. 9; 252/162; 252/170; 134/38; 134/39; 134/40

[58] Field of Search ................. 252/170, 171, DIG. 9, 252/162; 260/652.5; 134/38, 39, 40

[56] References Cited

U.S. PATENT DOCUMENTS

| | | | |
|---|---|---|---|
| 2,999,815 | 9/1961 | Eiseman, Jr. | 252/171 |
| 3,937,665 | 2/1976 | Mammino | 252/171 X |

FOREIGN PATENT DOCUMENTS

| | | | |
|---|---|---|---|
| 989,155 | 4/1965 | United Kingdom | 252/DIG. 9 |

OTHER PUBLICATIONS

Condendensed Chemical Dic., Rose 4th Ed. p. 729.

*Primary Examiner*—Mayer Weinblatt
*Attorney, Agent, or Firm*—Cushman, Darby & Cushman

[57] ABSTRACT

Solvent mixtures which are eminently useful for the removal of toner from items used in copying and duplicating processes consist of 1,1,2-trichloro-1,2,2-trifluoroethane, acetone and methylal.

3 Claims, No Drawings

CLEANING METHODS AND COMPOSITIONS

This invention relates to methods for cleaning articles, in particular to methods for cleaning articles contaminated with toner and to cleaning compositions.

Various machines or components thereof becme contaminated with toner and it is a difficult job to clean them. The problem is met for example in copying, duplicating and data processing equipment which utilise a variety of techniques.

Toner is a thermoplastic polymer and in one of said techniques using the xerographic method a toner based on methyl methacrylate is applied and adheres to the highly charged areas of a semi-conductor. From a pattern of electrical charges in the plate an image is transferred by applying paper to the toner-laden conductor. The toner powder adheres to the paper and is fixed thereon by heat or other methods.

In time toner is distributed on the components of copying machines and so is generally dispersed around the machines. Indeed under the influence of warm air within the machine toner melts and sticks to the various components of the machines. Other contaminants for example air-born dust and fluff are usually present in addition to the toner.

There comes a time when the machine has to be cleaned for maintenance and other reasons. This is far from easy because some organic solvents do not readily dissolve toner but rather soften or form a suspension of toner. Accordingly the solvent must be sufficiently powerful to dissolve toner which tenaceously adheres to the various surfaces of the machine. However the components to which toner adheres are very different in nature and function and can be, for example electrical units with cable attachments, electronic units, and units containing various plastic and metal materials. This means in turn that the solvent must not corrode or attack the intricate mechanism and should not attack the plastic substrates.

Means which have been used in cleaning of toner adhering to surfaces include jetting the machine or components thereof with methyl chloroform. However with increasing use of different plastic materials of construction there is a corresponding risk of likelihood of attack by said solvent.

Trichlorotrifluoroethane is useful in that it is a cleaning fluid that does not attack metal pieces or plastic substrates to a significant extent. However this material used alone is unsatisfactory for removal of toner. Indeed we find that trichlorotrifluoroethane (especially 1,1,2-trichloro-1,2,2-trifluoroethane) in admixture with organic auxiliary solvents which are well known as cleaning mixtures for example said trichlorotrifluoroethane in admixture with dichloroethylenes, ethyl alcohol, ter - butanol and acetonitrile are unsatisfactory for removal of toner from articles.

We have found that mixtures of trichlorotrifluoroethane and acetone may be used for the removal of toner. We prefer however to use mixtures of trichlorotrifluoroethane with acetone and methylal.

According to one aspect of the present invention we provide a method of cleaning an article contaminated with toner which comprises treating the contaminated article with a solvent composition which comprises a mixture of a major proportion by weight of trichlorotrifluoroethane and a minor proportion by weight of acetone.

When employing a mixture of 1,1,2-trichloro-1,2,2-trifluoroethane and acetone the proportion of 1,1,2-trichloro-1,2,2-trifluoroethane is generally at least 70% by weight of the total solvent mixture. More suitably the solvent mixture has a boiling point within 2° C (preferably within 0.5° C) of the boiling point of the azeotrope of 1,1,2-trichloro-1,2,2-trifluoroethane and acetone. The azeotropic mixture is very suitable and consists essentially of 88.9% by weight of 1,1,2-trichloro-1,2,2-trifluoroethane and 11.1% by weight of acetone and boils at 44° C at normal pressure. Other contaminants, for example, air-borne contaminants may also be present with the toner contaminant.

According to a preferred form of the invention we provide a method of cleaning an article contaminated with toner which comprises treating the contaminated article with a solvent composition comprising a mixture of a major proportion by weight of trichlorotrifluoroethane and a minor proportion by weight collectively of acetone and methylal.

When using such a mixture there is preferably present at least 80% by weight of 1,1,2-trichloro-1,2,2-trifluoroethane in the solvent mixture. Acetone is preferably present in proportion of at least 8% by weight but not greater than 15% by weight of the total solvent mixture. Methylal (otherwise known as dimethoxy methane) is normally present in at least 0.5% by weight of the total solvent mixture. More preferably there is present at least 2% by weight but not greater than 12% by weight of methylal with reference to the total solvent mixture. A particularly useful mixture is one approximating to 86% by weight 1,1,2-trichloro-1,2,2-trifluoroethane, 11% by weight acetone and 3% by weight methylal which mixture boils at 43.5% to 44° C at normal pressure.

The solvent composition may be brought into contact with separate items of equipment contaminated with toner, for example, xerographic toner or indeed to the copying machine itself containing the items. In the latter case panels of the machine will be removed to allow ingress of the solvent compositions into the interior of the machine.

Any suitable method of applying the solvent compositions to the contaminated article may be employed, for example, by using spraying techniques. Usually the composition drains from the article which is being treated and means can be provided for removal and recovery of the solvent composition.

The present invention includes within its scope solvent compositions which comprises a mixture of a major proportion by weight of trichlorotrifluoroethane and a minor proportion by weight collectively of acetone and methylal. The more suitable and preferred proportions by weight of the individual solvents in this solvent composition (containing methylal) are as hereinbefore disclosed. The solvent composition is useful in the cleaning of articles contaminated with toner and/or other contaminants. Such other contaminants include for example grease, oil, general dirt and fluxes.

Cationic, anionic and non-ionic surface active agents may be added to the solvent mixtures. Stabilisers can be employed particularly when the solvent mixture comes into contact with light metals, for example aluminium. Antistatic agents may also be added to the solvent composition. When the solvent composition contains additives such as surface active agents and/or stabilisers and these leave a stain on the surface of the article, the article can be rinsed, if desired, in the composition containing the solvents only.

The following examples illustrate the invention.

EXAMPLE 1

Pieces of equipment from a Rank Xerox Copying Machine Model 4000 which required cleaning were taken. These consisted of relay covers, electrical switch housing, wiring harnesses, toner screw conveyors, electrical assemblies and plastic trays which were contaminated with toner which had melted and stuck on the surfaces of the pieces. The pieces were jetted with ½ gallon to 1 gallon of the azeotropic mixture of 1,1,2-trichloro-1,2,2-trifluoroethane and acetone at ambient temperature over a period of 2 to 3 minutes with intervals of a few seconds.

The toner was adequately removed from all the pieces.

EXAMPLE 2

Contaminated pieces of equipment as described in Example 1 were treated in the manner of Example 1 except that the solvent mixture was a mixture of 1,1,2-trichloro-1,2,2-trifluoroethane (86% by weight), acetone (11% by weight) and methylal (3% by weight).

It was found that the toner was completely removed to leave the pieces in an extremely clean condition.

EXAMPLE 3

A Rank Xerox Copying Machine Model 4000 contaminated with toner had two panels removed to allow for thorough ingress of solvent mixture. Jets of the azeotropic mixture of 1,1,2-trichloro-1,2,2-trifluoroethane and acetone (volume 1 gallon) were applied at ambient temperature in the machine over a period of 3 minutes with intervals of a few seconds.

The toner was adequately removed from the machine and components.

EXAMPLE 4

The contaminated machine as described in Example 3 was treated in the manner of Example 3 except that the solvent mixture was a mixture of 1,1,2-trichloro-1,2,2-trifluoroethane (86% by weight), acetone (11% by weight), and methylal (3% by weight).

It was found that the toner was completely removed to leave the machine and components in an extremely clean condition.

What we claim is:

1. A method of cleaning an article contaminated with toner which comprises treating the contaminated article with a solvent composition consisting essentially of by weight of the total solvent mixture;

(a) at least 80% 1,1,2-trichloro-1,2,2-trifluoroethane;

(b) at least 8% but less than 15% acetone; and (c) from 0.5 to 12% methylal.

2. A method as claimed in claim 1 in which the proportion of methylal is at least 2%.

3. A method as claimed in claim 2 in which the solvent composition approximates to 86% 1,1,2-trichloro-1,2,2-trifluoroethane, 11% acetone and 3% methylal.

* * * * *